United States Patent [19]

Tentler et al.

[11] Patent Number: 4,961,220
[45] Date of Patent: Oct. 2, 1990

[54] POWER MANAGEMENT IN A MICROPROCESSOR-CONTROLLED BATTERY-POWERED TELEPHONE DEVICE

[75] Inventors: Michael L. Tentler; Michael L. Hightower, both of San Diego, Calif.

[73] Assignee: Spectrum Concepts, Inc., New York, N.Y.

[21] Appl. No.: 290,304

[22] Filed: Dec. 21, 1988

[51] Int. Cl.$^5$ .............................................. H04M 19/00
[52] U.S. Cl. ...................................... 379/413; 379/442; 323/223
[58] Field of Search ................ 379/413, 442; 323/223, 323/299; 320/39; 307/296 R, 150

[56]  References Cited
U.S. PATENT DOCUMENTS

4,803,719 2/1989 Ulrich .............................. 379/413 X

Primary Examiner—Stafford D. Schreyer
Attorney, Agent, or Firm—Dressler, Goldsmith, Shore, Sutker & Milnamow

[57] ABSTRACT

A telephone device, typically a terminal, that receives a.c. communication signals and that sinks d.c. current to provide the off-hook signal is powered from (i) the telephone lines and, if line voltage is less than 7.4 v.d.c., from (ii) a 6 v.d.c. battery. Connection to telephone lines of voltage greater than 7.4 v.d.c. recharges the battery. The terminal further contains a CMOS microprocessor that may be declocked and placed in standby mode to conserve power. When so placed, the microprocessor maintains some of its signal lines at a logic High, 6 v.d.c., condition. In order to both unpower circuits such as a display, a memory, a DTMF dialer, and a modem to which the microprocessor signal lines connect, and to (ii) disrupt current leakage paths from the signal lines to ground through the unpowered circuits, the ground is removed from the circuits. This removal, controlled by a signal from the standby microprocessor, is performed by a transistor switch.

42 Claims, 3 Drawing Sheets

POWER MANAGEMENT IN A MICROPROCESSOR-CONTROLLED BATTERY-POWERED TELEPHONE DEVICE

BACKGROUND OF THE INVENTION

1. Field of the Invention

The present invention generally concerns the management of power in microprocessor-controlled devices communicating across telephone lines, including in terminal devices. The present invention particularly concerns the telephone-line-recharging of the battery within a battery-powered telephone device. The present invention further particularly concerns the temporary removal of power from circuits that interface to a terminal's microprocessor during the standby operational mode of such microprocessor in a manner that prevents current drain from the charged communication lines of the microprocessor.

2. Background of the Invention

Devices that communicate across telephone lines, such as voice telephones, are commonly powered by the telephone lines. Telephone lines are energized at a central telephone switching station, or at a booster repeater, to a nominal voltage of about 48 v.d.c. Because of the resistance of its wires, the voltage across telephone lines drops with increasing spatial distance from points where the lines are charged. Over a great distance, typically many miles or kilometers, the voltage may typically drop to as little as 2–3 v.d.c.

In order for a telephone-line-connected device that contains electrical circuits requiring a fixed power supply voltage, nominally 5 v.d.c., to (i) function and (ii) communicate reliably across telephone lines when connected to such telephone lines at a point of low voltage potential, it is useful for the device to contain its own internal power source. Such an internal power source may be derived from normal a.c. wall power, or may alternatively be, especially in the case of a portable telephone device, derived from a self-contained power source, typically a battery. A self-contained internal power source such as a battery is also useful in portable telephone devices that are occasionally disconnected from the telephone lines and that need power during such periods of disconnection. Telephone devices may need power while disconnected, for example, in order to begin operation and to respond to operator commands before being connected to the telephone lines.

When a portable telephone device is powered by batteries then a problem is presented in maintaining the charged state of the batteries. If the batteries are disposable then they must be periodically tested, and must be disposed of when weak or over aged. When the batteries are rechargeable then they must be periodically recharged from an external source of power, normally from wall power. It is sometimes difficult to assess the charge condition of batteries, and to reliably maintain them in a fully charged state by regular maintenance. Accordingly, it would be desirable if a telephone device were able to use batteries while somehow reducing the maintenance requirements of such batteries.

In a related art area that also concerns the power consumption of telephone devices, it may be noted that the magnitude of the permissible, and occasionally mandated, direct current flow from telephone lines into a telephone, or telephone device, is generally large in relation to the power requirements of modern, solid state, telephone circuitry. For example, in order to produce the off-hook signal by which a central telephone exchange may recognize that a telephone, or telephone device, is connected to a telephone line, the telephone must draw, by specification, a minimum of 10 milliamperes direct current. The current drain by a telephone or telephone device is typically much greater, and may range to 100 milliamperes or more. This current is considerably larger than that which might be consumed by several solid state chips which, in aggregate, comprise a modern telephone or telephone device such as, for example, a terminal. For example, circuits including a commonly available microprocessor, a random access memory (RAM), a modem, a DTMF dialer, and a Liquid Crystal Display (LCD) might collectively be powered by a current of approximately 12 milliamperes at 5 v.d.c. It is thus the case that not only modern voice telephones, but also other digital electronics devices such as terminals, may readily be entirely powered by their connection to telephone lines—at least when such telephone lines maintain a voltage differential that is greater than the voltage requirements of the telephone device, typically 5 v.d.c.

In still another art area regarding telephones, it is known to make direct, non-transformer-coupled, connection of subscriber station telephone equipments to telephone lines. For example, one such connection is taught in U.S. Pat. Ser. No. 4,303,805 for a SUBSCRIBER STATION NETWORK to two inventors including one inventor of the present invention.

In still another art area, it is known that power may be conserved in certain microprocessor-based digital systems by declocking the microprocessor, and causing it to stop in a mode called "standby". This is particularly true of a microprocessor implemented in Complementary Metal Oxide Semiconductor (CMOS) logic that is based on Field Effect Transistors (FETs). CMOS logic uses appreciable power only when transitioning from one logical state to the other. If no clock is enabled, and no logic transitions ensue, then the power consumption of a CMOS technology microprocessor chip typically drops to the order of several microamperes at 5 v.d.c. One gate in the microprocessor, which gate is typically connected to an external switch or signal, typically remains active during the declocked state of the microprocessor. This gate remains active for receipt of an external signal such as may result from a manual switch activation. Upon the receipt of this external signal the microprocessor's clock is reenabled, and logic operations may be recommenced.

Although a CMOS technology microprocessor does not itself consume appreciable power when declocked in standby mode, the communication signal line drivers of such microprocessor may, in some cases, maintain the microprocessor's communication signal lines at a logic High, non-zero voltage, level. These signal lines connect to the receivers of other electronic circuits with which the microprocessor communicates. Normally these receivers are of high input impedance. Consequently, only a reasonable percentage of a running microprocessor's total power budget is consumed in switching its signal lines.

It may, however, be the case that upon such times as the microprocessor is declocked and placed in standby mode in order to reduce its operational power consumption that those electronic circuits to which the microprocessor connects across its communication lines are also, simultaneously, unpowered. The controlled and selective disruption of power to these circuits is conventionally accomplished by selectively disabling the supply of power voltage to these circuits. When the circuits are unpowered then the receivers in such circuits present an undesirable current leakage path to ground for the charged communication lines. This current drain must be supplied by the microprocessor. It increases the microprocessor's power consumption in its declocked, standby, mode.

Accordingly, it would be useful if a declocked, standby, microprocessor connecting through signal lines to one or more unpowered electrical circuits could have its current drain, and power loss, from its charged communication signal lines either be reduced or eliminated.

SUMMARY OF THE INVENTION

The present invention contemplates improved power management in an electronic system, typically by example in a microprocessor-based battery-powered terminal device that communicates across telephone lines. As one aspect of the invention it is contemplated to charge and to recharge the battery of, as well as to completely power, a battery-powered terminal device during its connection and use upon telephone lines that present an adequate d.c. voltage potential. Upon such times as the telephone line d.c. voltage is inadequate, then the charged battery powers the terminal device for telephone communication.

Another, second, aspect of the invention—separate and severable from the first aspect—contemplates that a declockable microprocessor that maintains at least some of its communication signal lines at a non-zero voltage when in standby mode may conserve power because certain electronic circuits that are suitably unpowered, and that connect to the communication signal lines, will be disconnected from ground.

In accordance with the first aspect of the present invention, a telephone device that (i) receives alternating current communication signals from telephone lines and (ii) sinks direct current from the same telephone lines in order to provide the off-hook signal, is powered from two sources. The alternating current communication signal upon the telephone line is connected to the telephone device through a capacitor that blocks the transmission of direct current. Meanwhile, a fixed voltage power source, typically a battery, is connected in electrical parallel across the telephone device. The battery powers the telephone device with direct current in the absence of any alternative source of direct current.

The telephone lines are further connected to the power source and telephone device through a virtual inductor. The virtual inductor blocks the transmission of alternating current while permitting the transmission of direct current. Upon such times as the voltage across the telephone lines is sufficiently greater than the fixed voltage of the power source then direct current will flow from the telephone lines to both (i) power the telephone device and (ii) charge the battery. Upon such times as the voltage across the telephone lines is not sufficiently greater than the fixed voltage of the power source then the power source will power the telephone device. The amount of the direct current that is drawn from the telephone lines is only that amount which would normally be drawn by a regular telephone. The current consumption is correspondingly not only permissible, but actually represents an effective use of power that would be wasted in a normal telephone.

In the preferred embodiment of a circuit realizing the first aspect of the invention, the virtual inductor is connected to positive voltage telephone line and includes a power transistor, typically an NPN type. For a virtual inductor connected to the negative telephone line, a PNP type power transistor is used. For the case of virtual inductor connection to the positive voltage telephone line, the NPN transistor's collector is connected directly to the positive voltage telephone line. Its base is connected through a first biasing resistor to the same one of the telephone lines, and also through an optional second biasing resistor to the parallel-connected power source and telephone device. The base is also connected by a capacitor to ground. Finally, the transistor's emitter is connected through an emitter resistor to the same power source and telephone device.

In accordance with the second aspect of the invention, powering of a digital electronic system including (i) a source of voltage, (ii) a ground, (iii) a declockable microprocessor that maintains at least some of its communication signal lines at a non-zero voltage in its standby condition, and (iv) one or more electronic circuit devices that communicate with the microprocessor upon the communication signal lines, is improved. The improvement comprises (v) a power switch that is responsive to a signal from the microprocessor indicating the microprocessor's standby state so as to disconnect the ground from selected electronic circuits with which the microprocessor communicates. Normally when the microprocessor enters the standby condition ground is disconnected to those circuits that are suitably powered down when the microprocessor is in standby. Typically all circuits that communicate with the microprocessor upon its communication signal lines have their ground removed, and are accordingly powered down.

In a typical embodiment some or all communication signal lines from the microprocessor assume a logical High, non-zero voltage, condition when the microprocessor is declocked, and is in standby mode. The power switch is responsive to some signal indicative of the standby state of the microprocessor in order to disconnect ground from the electronic circuit devices with which the microprocessor communicates. In the preferred embodiment of the invention, this STANDBY signal is a logic Low, zero voltage, level when the microprocessor is in standby, although the opposite convention could have been employed. This power switch is preferably constructed from two transistors.

The two aspects of the present invention, while separate and severable, may advantageously be used in combination, for example within a telephone-line-communicating battery-powered terminal device. Such a terminal device is both (i) dual powered and has (ii) internal digital communications lines which save power during standby periods of non-use of the terminal device. The terminal device includes a microprocessor, communicating across a digital communication lines, that is declockable while still powered. In its declocked condition the microprocessor (i) produces a STOP signal and (ii) maintains its digital communication signal lines at a non-zero voltage level. The device further includes one or more circuits that are connected to the digital communication signal lines for communicating with the running microprocessor. One of these circuits, normally a modem, is capacitively connected to the telephone lines for communicating an alternating current communications signal thereupon. A power switch means, responsive to the microprocessor's stop signal, disconnects ground from the one or more circuits when the microprocessor is declocked. Accordingly, current leakage from the microprocessor's charged communication signal lines is eliminated from this source.

Additionally, the terminal device includes a dual power source for powering the load consisting of the microprocessor in combination with the one or more circuits. This dual power source includes (i) a battery connected in electrical parallel with the load for providing direct current power to the load as a first source of power. The dual power source further includes (ii) a virtual inductor, connected in electrical series between the telephone lines and the parallel-connected battery and load, for providing (during the presence of sufficient voltage upon the telephone lines) direct current power to the load, and also to the battery, as a second source of power. By action of this dual power source both (i) the microprocessor and the one or more circuits are completely powered from the telephone lines, and (ii) the battery is charged, (during the presence of sufficient voltage upon the telephone lines). Conversely, if the voltage upon the telephone lines is insufficient, then the battery will provide direct current power to the microprocessor and to the one or more circuits.

These and other aspects and attributes of the present invention will become increasingly clear upon reference to the following drawings and accompanying specification.

DESCRIPTION OF THE PREFERRED EMBODIMENT

The present invention concerns the provision and management of primary power in a device connected to, and communicating across, telephone lines. Such a device may be, for example, a microprocessor-based terminal communicating on telephone lines through a built-in modem. Such a device may alternatively be a modern electronic telephone or other low-power telephone communications device.

The present invention also concerns the conservation of power on a microprocessor's digital communication signal lines that connects, during the standby condition of the microprocessor, to unpowered logic circuits. The microprocessor and logic circuits may be, for example, contained within a microprocessor-based terminal that communicatively interconnects to telephone lines. The microprocessor and associated circuits may be, however, contained within any microprocessor-based digital electronic system wherein it is desired to conserve power during a declocked, standby, condition of the microprocessor.

Figure 1:
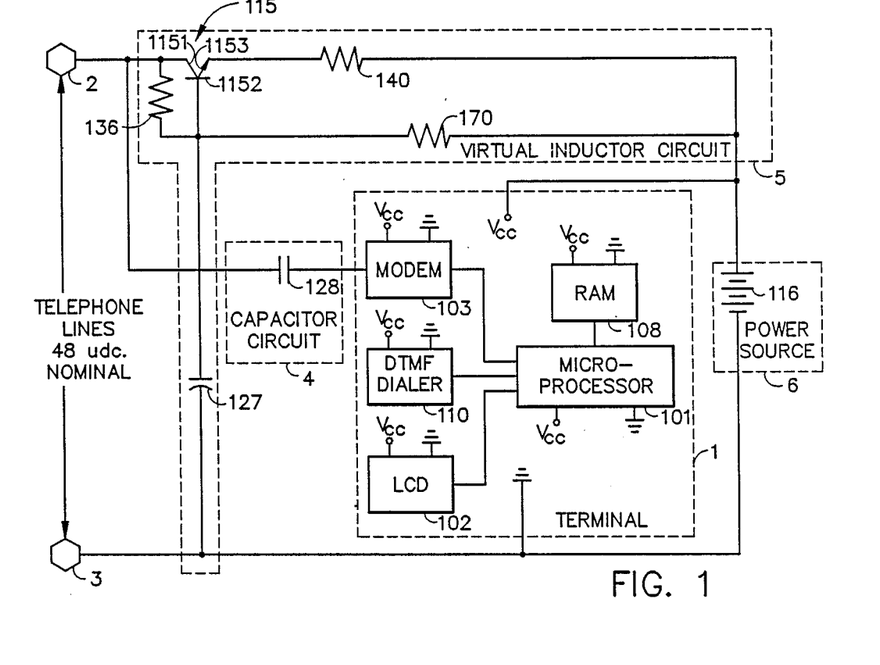
FIG. 1 is a simplified, conceptual, block diagram of a telephone-line-communicating device that, in accordance with a first aspect of the present invention, is dual powered from both the telephone lines and from an internal battery.

A simplified, conceptual, block diagram of the first aspect of the present invention is shown in FIG. 1. A telephone-line-communicating device, for example a terminal 1, is connected to telephone lines 2, 3 both for (i) communicating and for (ii) receiving power. The terminal 1 may include, for example, a MICROPROCESSOR 101, a Random Access Memory RAM 108, a Liquid Crystal Display LCD 102, a DTMF DIALER 110, and a MODEM 103. All circuits are powered between voltage Vcc and ground.

Alternating current communications signals on telephone lines 2, 3, are coupled through capacitor circuit 4 to an input communications signal port upon modem 103 of terminal 1. The capacitor circuit 4, typically consisting of capacitor 127 of value 10 microfarads 50v., precludes the flow of any direct current along the signal path connecting to modem 103. Other, active, electronic circuits might alternatively substitute for capacitor 127 in the capacitor circuit 4.

It is mandatory, however, that a telephone-line-communicating device should, on occasion, draw direct current from the telephone lines to which it is connected. For example, it is mandatory for a telephone device to drain greater than 10 milliamperes direct current from telephone lines in order to indicate the off-hook condition. A telephone device might typically sink about 20 milliamperes current or more in its off-hook operational condition.

Figure 3A:
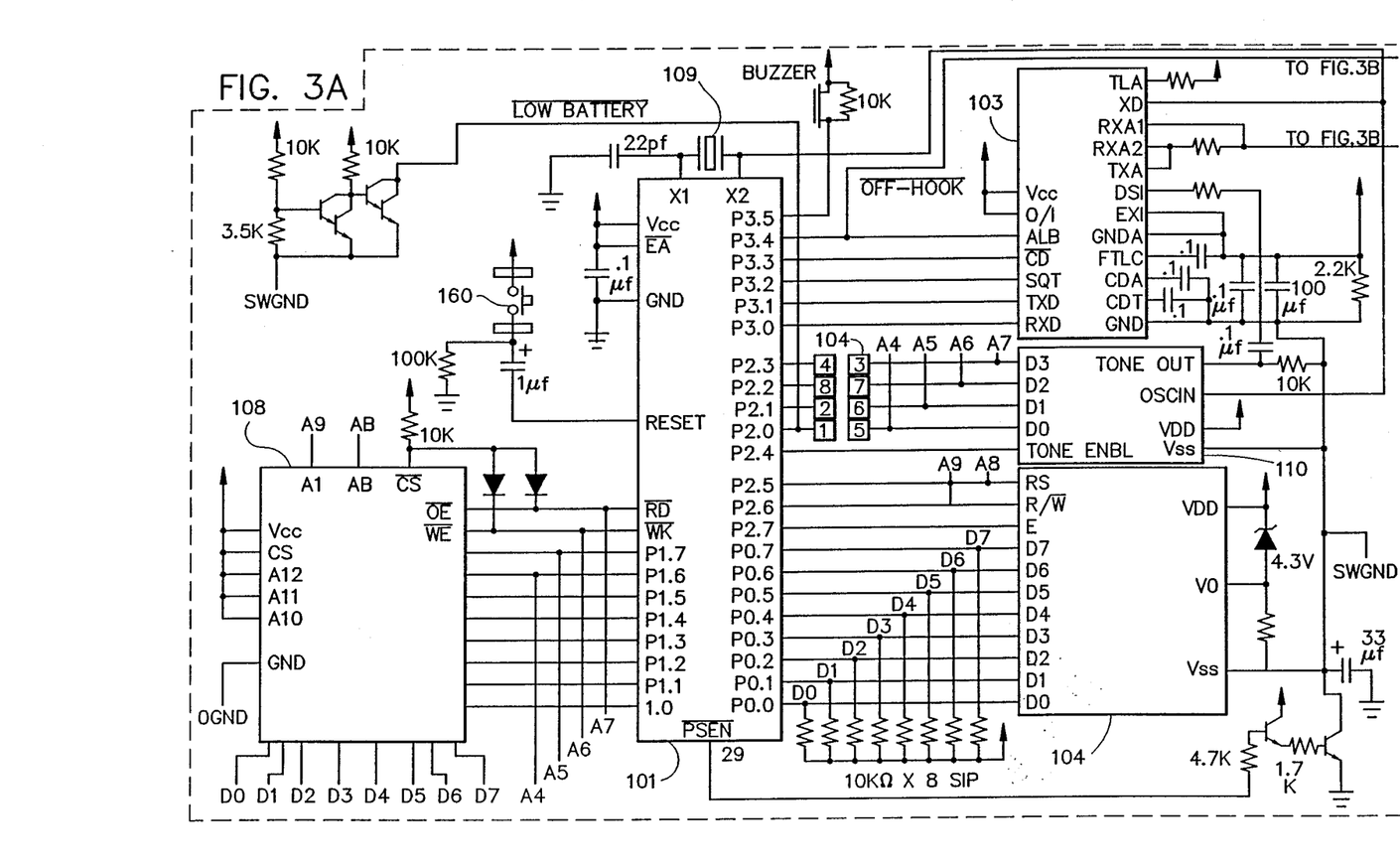
FIG. 3A, 3B are schematic diagram showing a preferred embodiment of a microprocessor-based telephone-line-communicating battery-powered telephone terminal in accordance with the present invention.
Figure 3B:
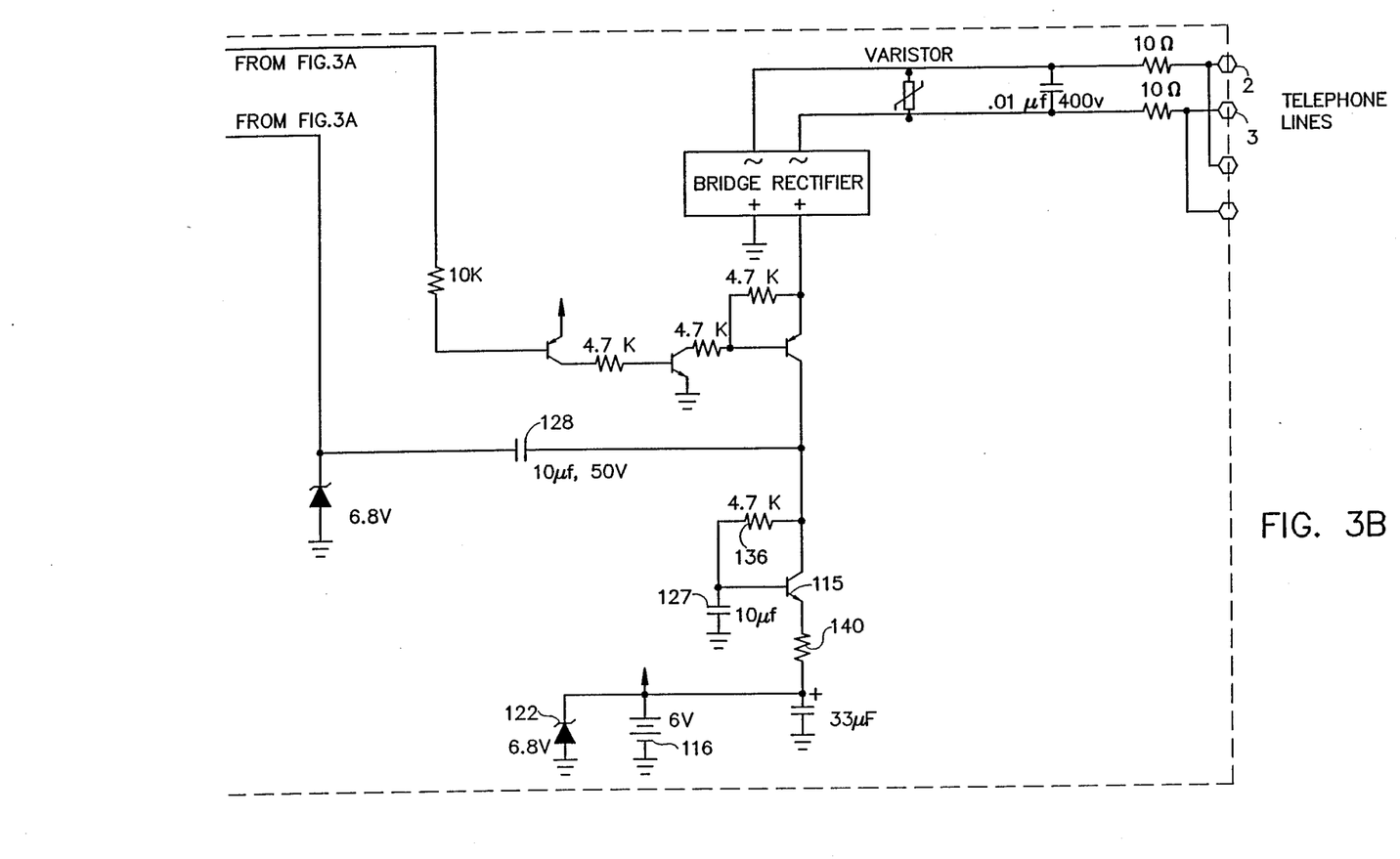

In accordance with the first aspect of the present invention, a direct current path between telephone lines 2, 3 exists through virtual inductor circuit 5 and the parallel connection of terminal 1 and power source 6. The virtual inductor circuit 5 includes a NPN power transistor 115, typically of type TIP29B. The collector 1151 of transistor 115 is connected to the telephone line 2 which is at a positive voltage, typically about 48 v.d.c., above telephone line 3. The base 1152 of transistor 115 is connected through first biasing resistance 136, typically of value 4.7K ohms, to the positive voltage telephone line 2. The same base 1152 of transistor 115 is preferably connected through a second bias resistor 170, typically of value 100K ohms, to the load consisting of terminal 1 in parallel with power source 6. The resistor 170 sets a current limit above which current will not rise when the resistance of the telephone loop to the central exchange becomes small (i.e., the telephone device is attached to telephone lines 2, 3 at a point close to a central station where the lines are charged). The resistor 170 may be omitted (and is correspondingly shown in phantom line) if it is desirable for current to rise, such as to increase charging current for the battery 116. This omission of resistor 170 is adapted in preferred embodiment terminal to be shown in schematic diagram in FIG. 3. Finally, the base 1152 is connected through capacitor 127 to ground. The emitter 1153 of transistor 115 is connected through load resistance 140, normally of value 100 ohms, to the same load.

The circuit 5 serves as a virtual inductor. It will pass direct current from telephone lines 2, 3 while not passing alternating current signals.

The biasing of the transistor 115 causes that it will, for a broad range of collector to emitter voltages in the order of +7.4 v.d.c. to +42 v.d.c., conduct approximately 20 milliamperes current. The maximum voltage that is between telephones 2, 3, is typically approximately +48 v.d.c. This voltage times the 20 milliampere current-carrying carrying capacity of transistor 115 dictates, by Ohm's law, that approximately 1 watt power is dissipated by transistor 115. This amount of power may be conservatively handled by a power transistor type TIP29B.

In the nominal construction of terminal 1 from monolithic solid-state semiconductor components a typical power consumption results in a direct current flow of approximately 12 milliamperes. Accordingly, a remaining portion of the 20 milliamperes current supplied from telephone lines 2, 3 through virtual inductor circuit 5, or approximately 8 milliamperes direct current, charges or recharges power source 6.

The power source 6 typically consists of a battery 116. The battery 116 may be regular or rechargeable. The battery 116 is typically of voltage 6 v.d.c., and is normally of an alkaline type such as Hitachi type 4LR 44. Such an alkaline battery is rechargeable at the modest nominal current of 8 milliamperes. Alternative battery types such as nickel cadmium that are more commonly associated with rechargeability may also be used.

A direct current will flow through virtual inductor circuit 5 to both power the terminal 1 and to charge the battery 116 only upon such times as the voltage between telephone lines 2, 3 is at a level greater than the collector-to-base, and base-to-emitter, voltage drops of transistor 115 above the voltage of battery 116. The collector to base, and the base to emitter, voltage drops of transistor 115 are each approximately 0.7 v.d.c. The battery 116 is approximately 6 v.d.c. Correspondingly, no current will flow from telephone lines 2, 3 through virtual inductor circuit 5 to the parallel-connected load of terminal 1 and battery 116 for a voltage between telephone lines 2, 3 of less than 6 v.d.c. As the voltage between the telephone lines 2, 3 increases from 6.0 v.d.c. to 7.4 v.d.c. then the current flow through transistor 115 and virtual inductor circuit 5 will gradually increase to the 20 milliamperes value. For voltages between telephone lines 2, 3 that are greater than 7.4 v.d.c., a maximum 20 milliamperes current will flow within transistor 115, and in virtual inductor circuit 5, to simultaneously power the terminal 1 and charge the battery 116.

At such times as the voltage across telephone lines 2, 3 is insufficient to provide the requisite nominal 12 milliamperes current flow that is necessary to power terminal 1, than this power will be provided by battery 116. Such a low voltage across telephone lines 2, 3 might occur, for example, at locations upon telephone lines that were distant from the locations, normally a central station, where such lines were charged. The utility of having an independent, battery, power source to terminal 1 is to both ensure the proper operation of the digital logic circuitry therein (which requires a minimum voltage for reliable operation), and also to ensure reliable signal communications upon telephone lines 2, 3.

It should be understood that the location of the virtual inductor circuit shown in FIG. 1 could be transpired relative to other elements. In particular, the virtual inductor circuit 5 could be implemented with a PNP transistor and could be situated in a path proceeding from the negative voltage telephone line 3 to the load consisting of the parallel-connected terminal 1 and power source 6.

Figure 2:
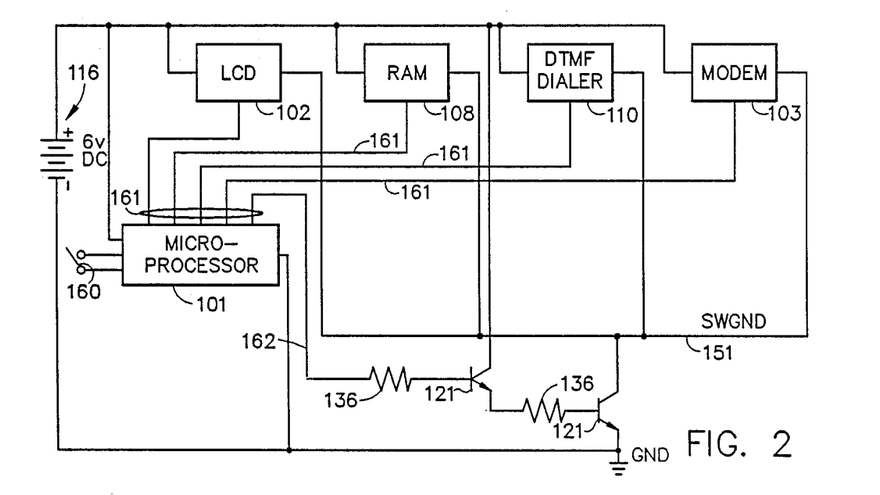
FIG. 2 is a simplified, conceptual, block diagram of a microprocessor-based digital electronic system in accordance with the present invention that reduces current drain from the logic High signal lines of the microprocessor during the declocked, standby, state of the microprocessor.

A simplified, conceptual, block diagram of a circuit demonstrating the second aspect of the present invention is shown in FIG. 2. A microprocessor 101 is connected between a positive voltage, typically +6 v.d.c., received from battery 106 and ground 150 for its supply of power. The microprocessor 101 is always powered. However, it may be disabled from cycling, and placed in a standby mode, by actuation of the OFF position of ON/OFF switch 160. The OFF actuation disables the operation of a crystal oscillator circuit within the microprocessor 101, which circuit includes the external crystal 109. The resultant lack of a clock signal "declocks" the microprocessor.

The microprocessor 101 is typically a type 80C51 that is constructed in Complementary Metal Oxide Semiconductor (CMOS) technology. This technology provides that when the microprocessor is declocked, meaning that no clock oscillator signal is generated, by action of ON/OFF switch 160 then the logic of the microprocessor will not change state, and the microprocessor will consume exceedingly little power. A transistor gate within the microprocessor 101 that senses the condition of the ON/OFF switch 160 will remain active, and will regate the clock oscillator signal from crystal 109 within the microprocessor 101, enabling the resumption of processing, if the switch 160 is momentarily placed ON.

During such times as the microprocessor 101 type 80C51 is in standby, or declocked, then its digital communication signal lines 161 are maintained in the logical High, non-zero voltage, condition. The signal lines 161 may constitute a digital communication signal lines, or they may be discrete signal lines. (In the preferred embodiment of the invention as a terminal shown in FIG. 7, some communication lines from microprocessor 101 are discrete and others constitute a bus that connects to RAM 108 and LCD 104.) However, some of the signal lines driven by the microprocessor, including signal line 162, will be maintained in the logic Low, zero volt, condition during the standby condition of microprocessor. It is common that a microprocessor maintains some of its communication signal lines in the logic High, non-zero voltage, condition, and still others in the opposite condition, while it is in standby mode. This operation is not unique to the type 80C51 microprocessor.

When it is desired to save power within the entire digital electronic system shown in block-diagram in FIG. 2, then it is routine to remove power from any or all of the Liquid Crystal Display LCD 102, the Random Access Memory RAM 108, the DTMF DIALER 110, and/or the MODEM 103 during such times as the microprocessor 101 is in standby mode. The LCD 102, RAM 108, DTMF DIALER 110, and MODEM 103 are exemplary only of the types of digital logic circuits that might be connected to a microprocessor 101 during, for example, its use as a terminal communicating upon telephone lines. Other well known digital logic circuits are also connectable to the microprocessor 101 upon its digital communication signal lines 161.

When any or all of the digital electronic circuits connected to microprocessor's communication signal lines 161 are powered off then they present a potential sink to the charge that microprocessor 101 attempts to maintain upon the signal lines 161. This sink, and the resultant current drain from the communication signal lines 161, constitutes a power drain upon the battery 106. Since this power drain serves no useful purpose with the microprocessor 101 in standby mode, it is desirably eliminated.

In accordance with the present invention, leakage of charge from the signal lines 161 to any of the circuits of LCD 102, RAM 108, DTMF DIALER 110 and/or MODEM 103 is precluded by controllably switching the ground applied to such circuits. Particularly, the ground 150 is applied to the circuits only during the running condition of microprocessor 101. This switching is accomplished by a power switch consisting of NPN transistors 121 and their associated bias resistances. The transistors 121, typically switching types 2N3904, are arranged as shown. They are biased by base resistors 136 that are each typically of value 4.7K ohms.

The power switch formed from transistors 121 is controlled by the signal output from microprocessor 101 upon line 162 so as to connect the system ground 150 to a ground distribution path, called SWGND meaning switched ground, 151 upon such times as the microprocessor 101 is running. In accordance with the well understood operation of NPN transistors, and of the switch formed from such transistors, this switching occurs upon a logic High, non-zero voltage, signal output upon line 162. When the microprocessor 101 is placed in a non-running, standby, mode by action of ON/OFF switch 160, then the voltage upon line 162 assumes a logic Low, zero voltage, level. This level causes that the ground distribution path SWGND is disconnected from system ground 150. Accordingly, although each of the LCD 102, RAM 108, DTMF DIALER 110, and MODEM 103 is still supplied with a positive +6 v.d.c., voltage supply from battery 106, these units are unpowered for lack of a closed circuit connection to ground 150. Additionally, and importantly, the LCD 102, RAM 108, DTMF DIALER 110 and MODEM 103 present no pathway to ground for the logical High, non-zero voltage levels upon the communication signal lines 161. By this action any current drain, and power loss, from these signal lines 161 is substantially prevented.

Both aspects of the present invention may be advantageously realized in combination, although it is possible to realize each aspect separately and severably. A preferred embodiment of a microprocessor-based battery-powered telephone-line-communicating terminal in accordance with the present invention is shown in FIG. 3. Depending on the microprogramming resident in memory 108, such a terminal may communicate across telephone lines 102, 103 for diverse purposes. It may be, for example, that the terminal is directed to communication with the computers of a bank for the performance of remote banking (exclusive of the acceptance of deposits and disbursement of cash) such as is normally performed at an automated teller machine. The transactions of remote banking that might be advantageously performed by a terminal device constructed in accordance with FIG. 3 include that the terminal operator should (i) view his bank balance, (ii) view his bank statements, (iii) bill payments, (iv) transfer funds, (v) inspect rates, and (vi) inspect bank locations.

By comparison with FIG. 1, the same telephone lines 2, 3, may be observed. The path through capacitor 127 by which an alternating current communication signal upon the telephone lines 2, 3 is coupled to the modem 103 may be readily identified, as may be the virtual inductor circuit 5 consisting of transistor 115, resistances 136 and 140, and capacitor 127. The direct current path proceeding from telephone lines 2, 3 through transistor 115 provides direct current both to power the operational circuits shown in FIG. 3 and to charge the battery 116. At such times as the telephone lines 2, 3 are not connected, or are at a voltage which is insufficient to supply the direct current requirements (normally 12 milliamperes) of the circuit shown in FIG. 3 then power for operation will be provided by battery 116.

A zener diode 122, typically of a 6.8 v.d.c. breakdown voltage, is connected in parallel with battery 116 to guard against application of overvoltage to terminal components when the terminal is hooked to telephone lines 2, 3 with the battery 116 removed. In such a case, forebearing the action of zener diode 122, the internal supply voltage could rise to the voltage of the telephone lines, or as high as +48 v.d.c., and could induce component failure.

By comparison to FIG. 2, the microprocessor 101, Liquid Crystal Display LCD 102, Random Access Memory RAM 108, DTMF DIALER 110 and MODEM 103 may each be observed in FIG. 3. The ON/OFF switch 160 connects to the microprocessor for internally controlling the powering by such microprocessor of external quartz crystal 109. When the microprocessor 101 is declocked, and placed in the standby mode, then its output signal PSEN on line 162 is a logic Low, typically 0 v.d.c., level. This signal disables transistors 121 from connecting system ground 150 to the distribution, switched, ground pathway SWGND 151. It may be noted that each of the LCD 102, RAM 108, DTMF TIMER 110 and MODEM 103 is powered by a voltage derived between the plus side of battery 116 and the switched ground distribution SWGND 151. If the switched ground SWGND is floating by action of transistors 121, then each of the LCD 102, RAM 108, DTMF DIALER 110, and MODEM 103 is not only powered off, but presents no path to ground to any of the logic High signal lines 161 (shown in FIG. 2) of microprocessor 101.

These identified components of the terminal, and others, may be located in the following parts list. Association of the parts within the following list with the schematic diagram shown in FIG. 3 will be routine to a practitioner of the art of digital logic and telephone equipment design.

| PARTS LIST | | | |
|---|---|---|---|
| REF. NO. | PART # | DESCRIPTION | QNT |
| 101 | 80C51 | MICROPROCESSOR (EPROM VERSION | 1 |
| 102 | LM068L | LCD ASSEMBLY | 1 |
| 103 | MM74HC943N | 300 BAUD MODEM | 1 |
| 104 | KEYPAD | KEYPAD ASSEMBLY | 1 |
| 105 | PCB | PRINTED CIRCUIT BOARD | 1 |
| 106 | 6V BAT | 6V BATTERY | 1 |
| 107 | TLPH WIRE | 6 POS. × 4 TELEPHONE WIRE | 1 |
| 108 | SXK5816PN | 2K × 8 BIT STATIC RAM | 1 |
| 109 | CRYSTAL | 3.579545 MHz CRYSTAL | 1 |
| 110 | TP5088N | DTMF GENERATOR | 1 |
| 111 | RJ11 | PHONE CONNECTOR W/WIRES | 2 |
| 112 | BOX | ENCLOSURE ASSEMBLY | 1 |
| 113 | BUZZER | CERAMIC RESONATOR-BUZZER | 1 |
| 114 | VARISTOR | 200V VARISTOR | 1 |
| 115 | TIP29B | TRANSISTOR | 1 |
| 116 | BRIDGE | BRIDGE RECTIFIER | 1 |
| 117 | MPSA14 | DARLINGTON TRANSISTOR | 2 |
| 118 | MPSA93 | 200 PNP TRANSISTOR | 1 |
| 119 | MPSA43 | 200V NPN TRANSISTOR | 1 |
| 120 | 2N3904 | SWITCHING NPN TRANSISTOR | 2 |
| 121 | 2N3906 | SWITCHING PNP TRANSISTOR | 1 |
| 122 | 1N5235 | 6.8V ZENER DIODE | 2 |
| 123 | 1N5229 | 4.3V ZENER DIODE | 1 |

-continued

PARTS LIST

| REF. NO. | PART # | DESCRIPTION | QNT |
|---|---|---|---|
| 124 | 1N914 | SIGNAL DIODE | 2 |
| 125 | 100μF,16V | ELECTROLYTIC CAPACITOR | 1 |
| 126 | 33μF,35V | ELECTROLYTIC CAPACITOR | 2 |
| 127 | 10μF,50V | ELECTROLYTIC CAPACITOR | 1 |
| 128 | 1μF,50V | ELECTROLYTIC CAPACITOR | 1 |
| 129 | 1μF,50V | MONOLITHIC CERAMIC CAPACITOR | 4 |
| 130 | .01μF,200V | CERAMIC DISC CAPACITOR | 1 |
| 131 | 22pF,50V | CERAMIC DISC CAPACITOR | 1 |
| 132 | 10K × 9 | 9 RESISTORS IN SIP | 1 |
| 133 | 100K | RESISTOR | 1 |
| 134 | 47K | RESISTOR | 1 |
| 135 | 10K | RESISTOR | 4 |
| 136 | 4.7K | RESISTOR | 4 |
| 137 | 3.3K | RESISTOR | 1 |
| 138 | 2.2K | RESISTOR | 2 |
| 139 | 620 OHM | RESISTOR | 1 |
| 140 | 100 OHM | RESISTOR | 1 |
| 141 | 10 OHM | RESISTOR | 2 |

In accordance with these and other aspects and attributes, the present invention may be considered a comprehensive approach to power management within a microprocessor-based battery-operated telephone-line-communicating device, and particularly within a terminal. Certain obvious adaptations and alterations of the principal aspects, and the preferred embodiments, of the present invention will be obvious to a practitioner of the arts of digital logic design. For example, inductive and capacitive electrical circuits for respectively separating the alternating current and direct current components of signal available on telephone lines might be implemented from other, well known, components and circuits (including active circuits) other than those shown in FIGS. 1 and 3. For example, the switched distribution of ground shown in FIGS. 2 and 3 need not be to each and every electrical circuit with which a microprocessor communicates, but may be, instead, only to such ones of these circuits as are desirably unpowered during such times as the microprocessor is in the standby mode.

In accordance with these and other obvious adaptations and alterations of the present invention, the present invention should be interpreted in accordance with the following claims, and not solely in accordance with that particular embodiment within which the invention has been taught.

What is claimed is:

1. An electrical circuit for powering a telephone device that (i) receives alternating current communications signals from telephone lines and that (ii) sinks direct current from the same telephone lines in order to provide an off-hook signal, the circuit comprising:
   a capacitor means for connecting an alternating current communication signal from telephone lines to a telephone device while blocking any flow of direct current from the telephone lines to the telephone device;
   a fixed voltage power source means connected in electrical parallel across the telephone device for powering the telephone device with direct current; and
   a virtual inductor means connected in electrical series between the telephone lines and the parallel-connected power source means and telephone device for sinking direct current from the telephone lines to the parallel-connected power source means and telephone device in order to provide an off-hook signal while blocking any flow of alternating current to the parallel-connected power source means and telephone device.

2. The circuit according to claim 1 wherein the capacitor means comprises:
   a capacitor.

3. The circuit according to claim 1 wherein the fixed voltage power source means comprises:
   a battery which, upon such times as the voltage across the telephone lines is lower than the fixed voltage, powers the telephone device.

4. An electrical circuit for powering a telephone device that (i) receives alternating current communications signals from telephone lines and that (ii) sinks direct current from the same telephone lines in order to provide an off-hook signal, the circuit comprising:
   a capacitor means for connecting an alternating current communication signal from telephone lines to a telephone device while blocking any flow of direct current from the telephone lines to the telephone device;
   a fixed voltage power source means connected in electrical parallel across the telephone device for powering the telephone device with direct current; and
   a virtual inductor means connected in electrical series between the telephone lines and the parallel-connected power source means and telephone device for sinking direct current from the telephone lines to the parallel-connected power source means and telephone device in order to provide an off-hook signal while blocking any flow of alternating current to the parallel-connected power source means and telephone device, the virtual inductor means including a transistor with its collector connected to one of the telephone lines, with its base connected through a first biasing resistor to the same one of the telephone lines and through a capacitor to ground, and with its emitter connected through an emitter resistor to the parallel-connected power source means and telephone device.

5. The circuit according to claim 4 wherein the transistor comprises:
   a NPN transistor with its collector connected to a positive voltage one of the telephone lines.

6. The circuit according to claim 4 wherein the transistor comprises:
   a PNP transistor with its collector connected to a negative voltage one of the telephone lines.

7. A telephone line and battery-powered telephone communications device comprising:
   a telephone means requiring direct current at a power input port in order to operationally communicate alternating current signals upon telephone lines at a signal port;
   a capacitor means in electrical series connection between the telephone lines and the signal port of the telephone means for communicating alternating current signals from the telephone lines to the signal port of the telephone means while substantially blocking any communication of direct current from the telephone lines to the signal port;
   a chargeable battery means electrically connected in parallel across the power input port of the telephone means for supplying direct current to the telephone means; and a virtual inductor means in electrical series connection between the telephone lines and the electrically parallel-connected telephone means and battery means for communicating direct current from the telephone lines to the power input port of the telephone means for purpose of enabling operation of the telephone means, and also to the battery means for purpose of charging the battery means, while substantially blocking any communication of alternating current signals from the telephone lines to the power input port of the telephone means.

8. The telephone communications device according to claim 7 wherein the telephone means comprises:
a modem receiving the alternating current signals.

9. The telephone communications device according to claim 8 wherein the telephone means further comprises:
a computer processor communicating with the modem across the digital communications bus.

10. The telephone communications device according to claim 7 wherein the capacitor means comprises:
a capacitor.

11. The telephone communications device according to claim 7 wherein the chargeable battery means comprises:
a battery.

12. A telephone line and battery-powered telephone communications device comprising:
telephone means requiring direct current at a power input port in order to operationally communicate alternating current signals upon telephone lines at a signal port;
capacitor means for communicating alternating current signals from telephone lines to the signal port of the telephone means while substantially blocking any communication of direct current from the telephone lines to the signal port;
chargeable battery means electrically connected across the telephone means for supplying direct current to the power input port of the telephone means; and
a transistor with its collector connected to one of the telephone lines, with its base connected through a first biasing resistors to the same one of the telephone lines and through a capacitor to ground, and with its emitter connected through an emitter resistor to the parallel-connected power source means and telephone device, for communicating direct current from the telephone lines to the power input port of the telephone means for enabling its operation, and also to the battery means for its charging, while substantially blocking any communication of alternating current signals from the telephone lines to the power input port.

13. The circuit according to claim 12 wherein the transistor comprises:
a NPN transistor with its collector connected to the positive voltage one of the telephone lines.

14. A method of powering at its power input port a telephone device that communicates signals upon telephone lines at its signal port, the method comprising:
isolating a direct current received on telephone lines to a first, direct current, path between the telephone lines;
isolating an alternating current signal received on telephone lines to a second, alternating current, path between the telephone lines;
connecting a power input port of a telephone device in electrical parallel with a battery;
connecting the telephone device at its power input port and the parallel connector battery between the telephone lines in the first, direct current, path; and
connecting the telephone device at its signal port between the telephone lines in the second, alternating current, path.

15. The method according to claim 14 wherein the isolating comprises:
extracting the direct current from the telephone lines through a virtual inductor.

16. The method according to claim 14 wherein the isolating comprises:
extracting the alternating current signal from the telephone lines through a capacitor.

17. A dual-powered telephone-line-communicating terminal device comprising:
a microprocessor for communicating upon communications signal lines;
a modem connected to the digital communications signal lines for communicating with the microprocessor, and capacitively connected to telephone lines for communicating an alternating current communications signal thereupon; and
a dual power source for powering a load including both the microprocessor and the modem comprising:
a battery in electrical parallel with the load for providing direct current power to the load as a first source of power; and
a virtual inductor, connected in electrical series between the telephone lines and the parallel-connected battery and load, and responsive to the presence of sufficient voltage upon the telephone lines for providing direct current power to the load, and also to the battery, as a second source of power.

18. The terminal device according to claim 17 further comprising:
a memory, powered by the dual power source, for communicating with the microprocessor upon the communications signal lines.

19. The terminal device according to claim 17 further comprising:
a display, powered by the dual power source, for communicating with the microprocessor upon the communications signal lines.

20. The terminal device according to claim 17 further comprising:
a DTMF dialer, powered by the dual power source, for communicating with the microprocessor upon the communications signal lines.

21. A dual-powered telephone-line-communicating terminal device comprising:
a microprocessor for communicating upon communications signal lines;
a modem connected to the digital communications signal lines for communicating with the microprocessor, and capacitively connected to telephone lines for communicating an alternating current communications signal thereupon; and
a dual power source for powering a load including both the microprocessor and the modem comprising:
a battery in electrical parallel with the load for providing direct current power to the load as a first source of power; and a transistor with its collector connected to one of the telephone lines, with its base connected through a first biasing resistor to the same one of the telephone lines and through a capacitor to ground, and with its emitter connected through an emitter resistor to the parallel-connected power source means and telephone device, responsive to the presence of sufficient voltage upon the telephone lines for providing direct current power to the load, and also to the battery, as a second source of power.

22. The terminal device according to claim 21 wherein the dual power source's transistor comprises:
a NPN transistor with its collector connected to the positive voltage one of the telephone lines.

23. A digital electronic system comprising:
a source of voltage;
a ground;
a declockable microprocessor, connected between the source of voltage and the ground for receiving operational power, that maintains at least some of its communications signal lines at a non-zero voltage in its declocked condition and that produces a STANDBY signal when declocked;
an electronic circuit, receiving operational power by connection between the source of voltage and ground, communicating with the microprocessor upon the communication signal lines;
a permanent connection between the source of voltage and the electronic circuit device; and
a power switch responsive to the microprocessor's STANDBY signal for disconnecting the ground from the electronic circuit when the microprocessor is stopped, and for selectively connecting the ground to the electronic circuit in order that it may be provided power for its operation.

24. The system according to claim 23 wherein the power switch further comprises:
a transistor switch responsive to a logic Low, zero voltage, signal from the microprocessor for disconnecting the ground.

25. The system according to claim 24 wherein the transistor switch further comprises:
two transistors.

26. A method of reducing the standby, non-running, power consumption of charged communications signal lines connecting to an electronic circuit that is unpowered during the period of standby comprising:
disconnecting any path to ground from the charged communications signal lines through the unpowered electronic circuit by disconnecting one common ground.

27. The method according to claim 26 wherein the disconnecting comprises:
selectively gating ground to the electronic circuit that connects to the communications signal lines conditionally upon the standby, non-running, condition of a microprocessor that also connects to the digital communication signal lines.

28. The method according to claim 27 wherein the selectively gating ground comprises:
disabling ground to the electronic circuit conditionally upon a logic Low, zero voltage, condition of a signal from the microprocessor and enabling ground to the electronic circuit conditionally upon a logic High, non-zero voltage, condition of the same signal.

29. An electrical circuit apparatus for reducing the current drain from a declocked microprocessor that maintains at least some of its communications signal lines charged at a non-zero voltage when it is declocked, and at least one unpowered electronic circuit connecting to such communication signal lines, comprising:
a power source supplying non-zero voltage and ground and having a ground distribution pathway;
a microprocessor, connected between the power source's voltage and ground for receiving operational power, that maintains at least some of its communications signal lines charged at a non-zero voltage in its declocked condition, said microprocessor producing a STANDBY signal when stopped;
ground signal switch means, connected to the power source's voltage and ground for receiving operational power, responsive to the microprocessor's STANDBY signal for disconnecting the power source's ground from a ground distribution pathway;
an electronic circuit, connected between the power source's voltage and the ground distribution pathway for receiving operational power, that communicates with the operating microprocessor upon the at least some communications signal lines.

30. The apparatus according to claim 29 wherein the ground signal switch means comprises:
transistor means responsive to a logic Low, zero voltage, STANDBY signal from the microprocessor for disconnecting the power source's ground from the ground pathway by action of switching.

31. The apparatus according to claim 30 wherein the transistor means comprises:
two transistors.

32. A telephone-line-communicating terminal device having internal digital communications signal lines which conserve power during periods of non-use of the terminal device, the terminal device comprising:
a microprocessor that is stoppable, while still powered, during periods of non-use of the terminal device, said microprocessor in its stopped condition producing a STANDBY signal and maintaining its digital communications signal lines across which it communicates charged at a non-zero voltage level;
communication circuit means for communicating via telephone lines and also with an unstopped microprocessor via the digital communications signal lines; and
power switch means, responsive to the microprocessor's STANDBY signal, for disconnecting ground from the communication circuit means when the microprocessor is stopped.

33. The terminal device according to claim 32 wherein the communication circuit means comprises:
a modem.

34. The terminal device according to claim 32 wherein the communications circuit means comprises:
a DTMF dialer.

35. The terminal device according to claim 32 further comprising:
a memory for communicating with the unstopped microprocessor via the digital communications signal lines;
wherein the power switch means is further for disconnecting ground from the memory when the microprocessor is stopped.

36. The terminal device according to claim 35 further comprising:
   a display for communicating with the unstopped microprocessor via the digital communications signal lines;
   wherein the power switch means is further for disconnecting ground from the display when the microprocessor is stopped.

37. The terminal device according to claim 32 wherein the power switch means comprises:
   transistor means responsive to a logic Low, zero voltage, STANDBY signal from the microprocessor for disconnecting the power source's ground from the ground pathway by action of switching.

38. The terminal device according to claim 37 wherein the transistor switch further comprises:
   two transistors.

39. A dual-powered telephone-line-communicating terminal device having internal digital communication lines which conserves power during periods of non-use of the terminal device, the terminal device comprising:
   a microprocessor, communicating upon a digital communications signal lines, that is declockable, while still powered, during periods of non-use of the terminal device whereupon in its declocked condition the microprocessor will (i) produce a STANDBY signal and (ii) maintain some of its digital communications signal lines charged at a non-zero voltage level;
   communication circuit means connected to the digital communications signal lines for communicating with the running microprocessor on the communications signal lines, and capacitively connected to telephone lines for communicating an alternating current communications signal thereupon;
   power switch means, responsive to the microprocessor's STANDBY signal, for disconnecting ground from the communication circuit means when the microprocessor is declocked; and
   a dual power source for powering a load including both the microprocessor and the communication circuit means including
   a battery in electrical parallel with the load for providing direct current power to the load as a first source of power; and
   a virtual inductor, connected in electrical series between the telephone lines and the parallel-connected battery and load, for providing, during such times as sufficient voltage exists upon the telephone lines, direct current power to the load, and also to the battery, as a second source of power.

40. An electrical circuit for interconnecting a telephone device that communicates signals upon a signal port and that receives power at a power port to the two telephone lines, the circuit comprising:
   a capacitor means, connected in electrical series with a signal port of a telephone device between two telephone lines, for communicating alternating current signals from the two telephone lines to the telephone device while blocking any flow of direct current from the two telephone lines to the signal port of the telephone device;
   a current-gating virtual inductor means, connected in electrical series with a power port of the telephone device between the two telephone lines, responsive to a control voltage received at a control port for gating direct current from the two telephone lines to the telephone device while at all times, and regardless of the control voltage, blocking any flow of alternating current signals from the telephone lines to the power port of the telephone device; and
   a voltage reference, connected in electrical series with the control port of the virtual inductor means between the two telephone lines, for voltage biasing the current-gating virtual inductor with the control voltage to control the amount of direct current gated thereby.

41. The electrical circuit according to claim 40 wherein the voltage reference is also connected in electrical parallel with the telephone device across the power port thereof, and serves to supply direct current to the telephone device in parallel with the direct current gated by the current-gating virtual inductor means.

42. The electrical circuit according to claim 41 wherein the current-gating virtual inductor means comprises:
   an NPN transistor having
      its collector connected to a positive voltage one of the two telephone lines,
      its base connected through a first biasing resistor to the same positive voltage one of the two telephone lines, through a capacitor to the other one of the two telephone lines, and through a second biasing resistor to the voltage reference so that, by the control voltage applied thereto, the current flow from collector to emitter may be controlled, and
      its emitter connected through an emitter resistor to the parallel-connected voltage reference and telephone device.

* * * * *